Oct. 26, 1926.
J. J. WITKOWSKI
FASTENING DEVICE
Filed May 27, 1926
1,604,330
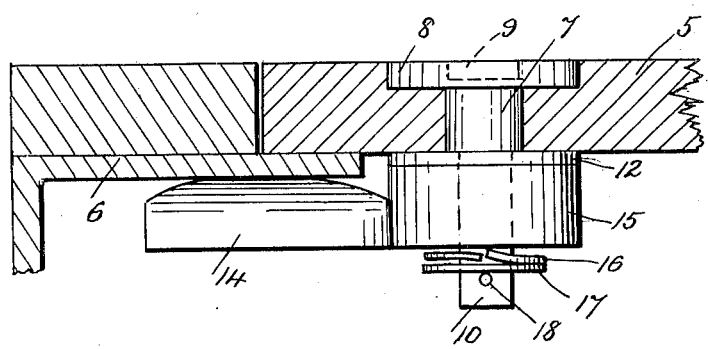
FIG_1_
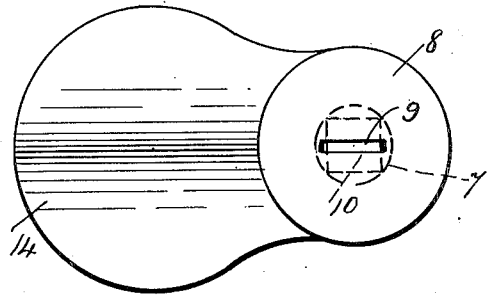
FIG_2_
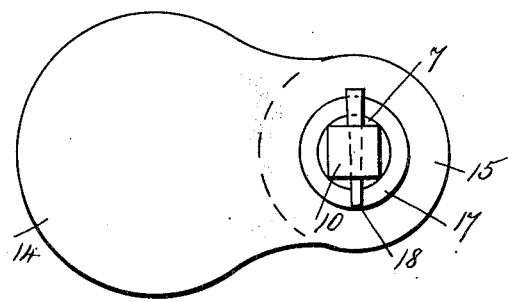
FIG_3_
Inventor
James J. Witkowski
by Herbert W. Jenner,
Attorney.

Patented Oct. 26, 1926.

1,604,330

UNITED STATES PATENT OFFICE.

JAMES J. WITKOWSKI, OF ALBION, NEW YORK.

FASTENING DEVICE.

Application filed May 27, 1926. Serial No. 112,184.

This invention relates to fastening devices for trap doors such as used in the floors of motor cars over storage batteries and other parts, which trap doors have to be removed and replaced frequently; and it consists in the novel construction and combination of the parts hereinafter fully described and claimed.

In the drawings, Figure 1 is a side view of a fastening device constructed according to this invention, showing a portion of the trap door and its seat in section. Fig. 2 is a plan view of the fastening device, from above. Fig. 3 is a plan view of the fastening device, from below.

Each corner of the trap door 5 is preferably provided with a similar fastening device, to hold the trap door on its seat 6, which may be a portion of the chassis beam and floor of a motor car. A cylindrical pin 7 is provided having a circular head 8, and is journaled in a hole in the trap door. The head 8 has a slot 9 so that it can be revolved by a screw-driver. The lower part 10 of the pin below the trap door is square, and has a large washer 12 on it next to the trap door. Washers 12 of different thickness are used to adapt the device to doors and seats of different sizes or proportions. A locking tongue 14 is provided, and has a hub 15 which is slid loosely upon the square part 10 of the pin.

The upper side of the tongue is rounded longitudinally and transversely so that it can bear freely against the underside of the seat 6 or top member of the chassis beam. A spring washer 16 is slipped on the pin below the hub 15, and is a split washer bent to helical form. A small ordinary washer 17 is slipped on the pin against the spring washer, and the locking tongue and the washers are held in place on the pin by a tapered cross-pin 18 inserted in a hole formed crosswise through the lower end portion of the rectangular part 10. The spring washer is contracted a little when the locking tongue is turned forcibly to lock the trap door to its seat, and it prevents the trap door from rattling, and the tongue from working around.

What I claim is:

A locking device for a trap door, comprising a pin having a cylindrical portion and a cylindrical head adapted to be let into and journaled in a hole in the trap door, said head having a slot for a tool for revolving the pin from one side of the trap door, said pin having a rectangular portion adapted to project on the other side of the trap door, a locking tongue for the trap door mounted loosely on the said rectangular portion, and a spring device mounted on the free end portion of the pin to press the locking tongue against the seat of the trap door.

In testimony whereof I have affixed my signature.

JAMES J. WITKOWSKI.